United States Patent
Kokubu et al.

[11] Patent Number: 6,144,033
[45] Date of Patent: Nov. 7, 2000

[54] MARK INSPECTING SYSTEM

[75] Inventors: Takao Kokubu, Akishima; Hiroki Kunitake, Kodaira, both of Japan

[73] Assignee: Bridgestone Corporation, Tokyo, Japan

[21] Appl. No.: 09/276,932

[22] Filed: Mar. 26, 1999

[30] Foreign Application Priority Data

Mar. 26, 1998 [JP] Japan .................................. 10-078910

[51] Int. Cl.⁷ ............................ G01F 23/00; G01B 15/06
[52] U.S. Cl. ............................................ 250/358.1; 378/61
[58] Field of Search .............................. 73/146, 460, 461, 73/462; 250/358.1, 559.44; 427/8, 9, 10; 378/61; 355/53; 356/239.8

[56] References Cited

U.S. PATENT DOCUMENTS

| | | | |
|---|---|---|---|
| 4,207,470 | 6/1980 | Heisner et al. ...................... | 250/358.1 |
| 4,260,889 | 4/1981 | Osborn et al. ....................... | 250/358.1 |
| 4,308,747 | 1/1982 | Reed ...................................... | 73/146 |
| 4,670,289 | 6/1987 | Miller, III .................................. | 427/8 |
| 5,905,199 | 5/1999 | Scarpetti et al. ........................ | 73/146 |

FOREIGN PATENT DOCUMENTS 6-84002  3/1994  Japan ............................... G06K 7/10

*Primary Examiner*—Georgia Epps
*Assistant Examiner*—David N. Spector
*Attorney, Agent, or Firm*—Sughrue, Mion, Zinn, Macpeak & Seas, PLLC

[57] ABSTRACT

A mark inspecting system comprises a camera (30) held in a predetermined position on a marking device (20) capable of being located close to or in contact with a tire (1) supported on a marking table (3) to form a mark (M) on the tire (1), a photocoupler (36) for detecting the separation of the marking device (20) by a predetermined distance from the tire (1) after the mark (M) has been marked on the tire (1), a controller (35) for operating the camera (30) to form an image of the mark marked on the tire (1) upon the reception of a detection signal provided by the photocoupler (36) upon the detection of the separation of the marking device (20) by the predetermined distance from the tire (1), and an image processing device (31) for analyzing the image of the mark (M) formed by the camera (30) for the inspection of the mark (M).

4 Claims, 6 Drawing Sheets

MARK INSPECTING SYSTEM

BACKGROUND OF THE INVENTION

1. Field of the Invention

The present invention relates to a mark inspecting system for inspecting marks formed on a tire. The term, "tire" is used herein to signify both a finished tire and a semifinished tire still in process.

2. Description of the Related Art

Marks including a uniformity mark indicating acceptable uniformity determined by the measurement of a tire and a balance mark indicating a lightest portion of the tire are marked on the side wall of the tire by a marking device. Operators inspect tires visually to see if the marks are formed properly. However different operators give different decisions, and the visual inspection of the marks by the operators takes much time and has been an obstacle to the perfect automation of a inspection line for labor saving.

An automatic mark inspecting system is disclosed in JP-A No. 6-84002. This prior art automatic mark inspecting system places a tire provided with a mark on a rotating inspection table, rotates the rotating inspection table supporting the tire, and photographs the mark formed on the tire by a camera for inspection. This automatic mark inspecting system needs the special rotating inspection table and a conveying mechanism for conveying the tire onto the rotating inspection table. Therefore, this known automatic mark inspecting system needs great equipment and operating costs, and a large space for installation. Thus, this known automatic mark inspecting system is low in space efficiency. Furthermore, this known mark inspecting system needs to position the tire on the rotating table for photographing by a camera, which requires a special positioning device.

A tire marked by the marking device is conveyed to a mark inspecting process and marks marked on the tire are inspected some time after the marks have been marked on the tire. Therefore, if the marking device is not operating normally and faulty marks are formed on the tire, faulty marks will be formed on a plurality of tires before the faulty marks are found in the mark inspecting process, which reduces production efficiency.

SUMMARY OF THE INVENTION

The present invention has been made in view of the foregoing problems in the prior art and it is therefore an object of the present invention to provide a mark inspecting system capable of inspecting a mark marked on a tire immediately after the mark has been marked on the tire.

According to one aspect of the present invention, a mark inspecting system comprises a camera held in a predetermined position on a marking device capable of being located close to or in contact with a tire supported on a marking table to form a mark on the tire, a detecting means for detecting the separation of the marking device by a predetermined distance from the tire after the mark has been marked on the tire, a control means for operating the camera to form an image of the mark marked on the tire upon the reception of a detection signal provided by the detecting means upon the detection of the separation of the marking device by the predetermined distance from the tire; and a mark inspecting means for analyzing the image of the mark formed by the camera for the inspection of the mark.

Since the camera is held on the marking device capable of being moved toward or being brought into contact with the tire, the image of the mark formed on the tire can be formed by the camera after the marking device has been separated by the predetermined distance from the tire, and the mark can be inspected by analyzing the image of the mark formed by the camera. Accordingly, any large devices specially for inspection and space for installing such devices are unnecessary, the mark inspecting system can be fabricated at a low cost and uses an available space efficiently. The mark inspecting device takes only a very short time for inspection, and an image of the mark marked on the tire can be formed and the mark can be inspected by analyzing the image immediately after the mark has been marked on the tire. Therefore a useless marking operation forming faulty marks on a plurality of tires can be avoided and hence production efficiency of a tire production line can be improved.

In this mark inspecting system, the mark inspecting means discriminates between acceptable marks and an unacceptable marks. Since the condition of the a mark can be inspected immediately after the mark has been marked on a tire, the malfunction of the marking device can be detected without delay.

In this mark inspecting system, the mark inspecting means inspects a mark marked on a tire to see if the mark is proper for the tire. An image of the mark marked on the tire is analyzed to see if the mark is proper for the tire.

This mark inspecting system may further comprise an illuminating device held on the marking device. The illuminating device held on the marking device is able to illuminate a mark marked on a tire effectively and, consequently, the camera is able to form a clear image of the mark. The illuminating device scarcely needs additional space.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

A mark inspecting system in a preferred embodiment according to the present invention will be described with reference to FIGS. 1 to 6 as applied to the inspection of a balance mark M marked by a marking process at a lightest point on the side wall of a tire to indicate a lightest portion of the tire determined by a uniformity measuring process. The mark inspecting system forms an image of the balance mark M and analyzes the image of the balance mark for inspection.

Figure 1:
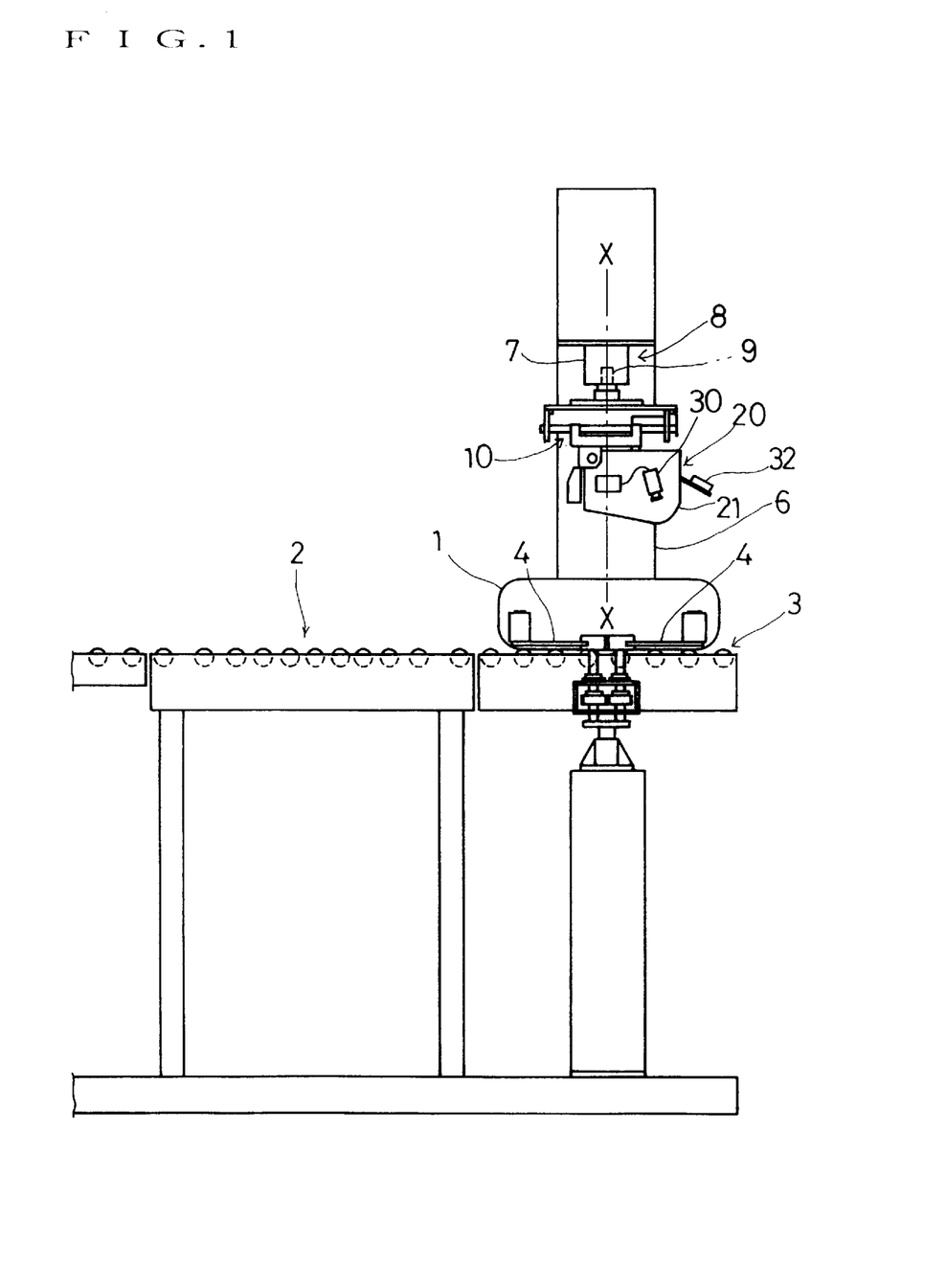
FIG. 1 is a side elevation of a marking device.
Figure 2:
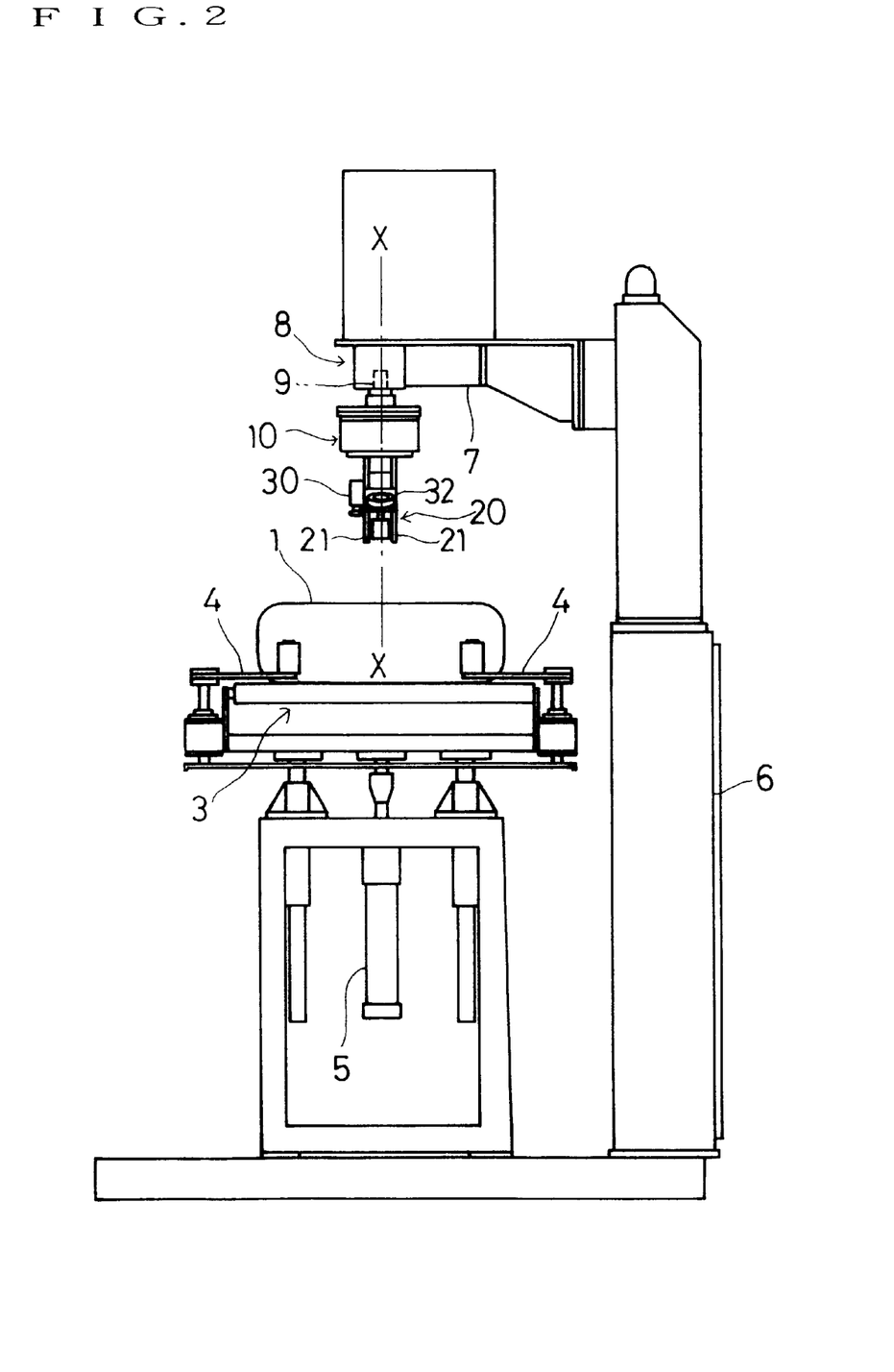
FIG. 2 is a front elevation of the marking device shown in FIG. 1.
Figure 3:
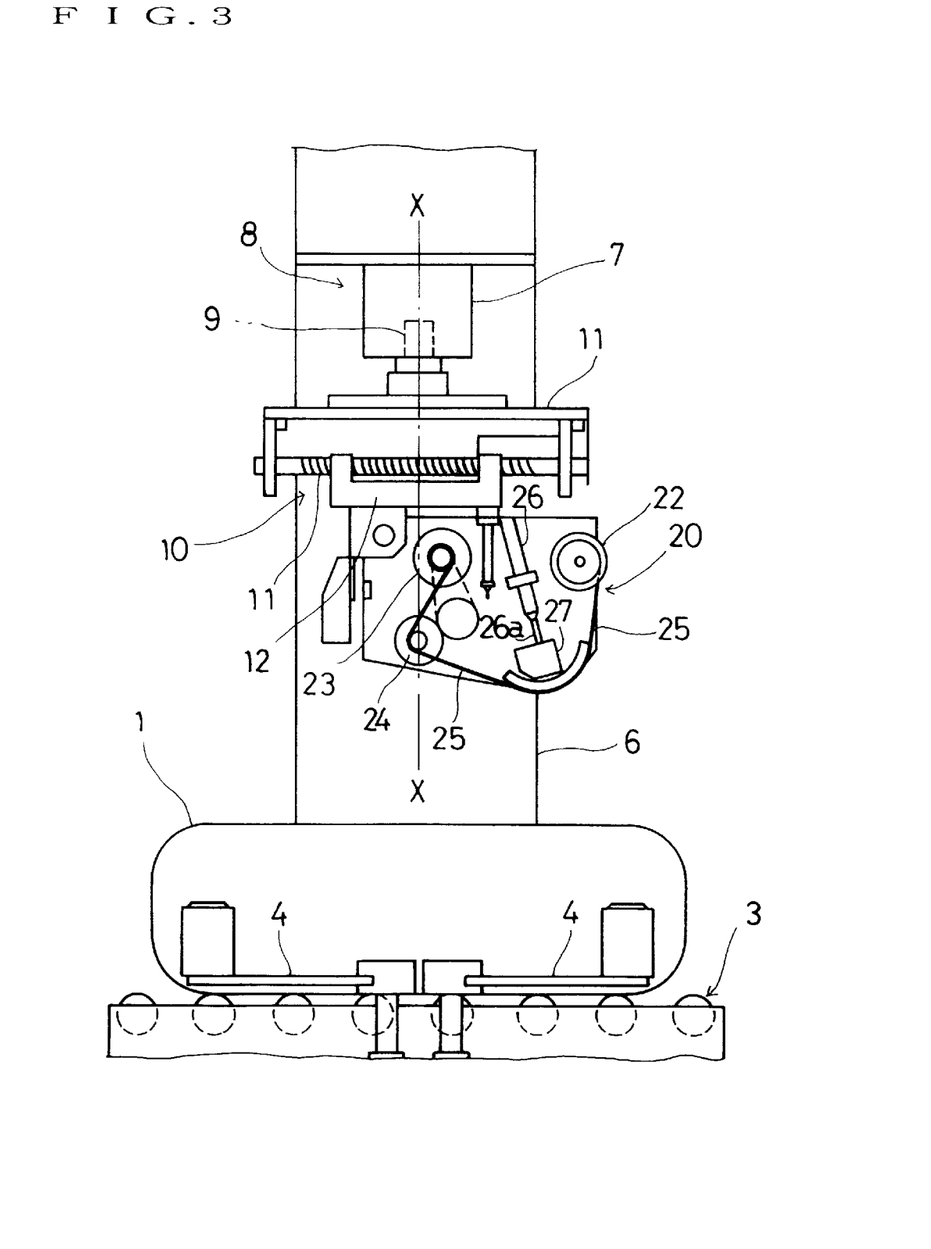
FIG. 3 is a fragmentary side elevation of the marking device shown in FIG. 1.

Referring to FIGS. 1 and 2, a marking device for carrying out the marking process has a roller conveyor 2, a marking table 3 provided with conveying rollers and disposed contiguously with the roller conveyor 2, and a centering mechanism provided with centering arms 4. The roller conveyor 2 transfers a tire 1 examined by uniformity measurement to the marking table 3 positioned at a tire transfer position, and then the tire 1 is centered by the centering arms 4 of the centering mechanism and is fixedly held by the centering mechanism on the marking table 3. The marking table 3 can be moved in vertical directions between the tire transfer position and a marking position by a cylinder actuator 5 disposed under the marking table 3. The tire 1 is conveyed by the roller conveyor 2, is transferred from the roller conveyor 2 to the marking table 3 positioned at the tire transfer position on the same level as the roller conveyor 2, the tire 1 is centered and is fixedly held on the marking table 3, and then the marking table 3 is raised by the cylinder actuator 5 to the marking position.

An arm 7 is held horizontally above the marking table 3 on a column 6. A rotating mechanism 8 is mounted on a free end part of the arm 7. A vertical rotating shaft 9 supported on the free end part of the arm 7 is driven for rotation by a motor, not shown. The center axis X—X of the tire 1 correctly centered by the centering arms 4 on the marking table 3 is aligned with the axis of the rotating shaft 9. A horizontal drive unit 10 is connected to the lower end of the rotating shaft 9. The horizontal drive unit has a threaded rod 11 supported in a horizontal position for rotation on a support frame 11a, and a nut member 12 linked to the threaded rod 11. The threaded rod 11 is rotated to move the nut member 12 horizontally. A marking device 20 is suspended on the nut member 12. The marking device 20 has a pair of side plates 21 having upper end parts fixed to the nut member 12. A supply reel 22, a take-up reel 23 and an idle pulley 24 are disposed between and supported for rotation on the pair of side plate 21. A thermal transfer ribbon 25 supplied from the supply reel 22 travels through the idle pulley 24 and is taken up by the take-up reel 23. A heating head 27 internally provided with a heating element is pressed against a portion of the thermal transfer ribbon 25 extending between the supply reel 22 and the idle pulley 24 by an actuating rod 26a of a cylinder actuator 26 to push the portion of the thermal transfer ribbon 25 obliquely downward. The thermal transfer ribbon 25 is fed intermittently by one pitch at a time. The cylinder actuator 26 pushes the heating head 27 toward the tire 1 to print the balance mark M on a side wall of the tire 1 by pressing the thermal transfer ribbon 25 against the side wall of the tire 1.

The horizontal position of the marking device 20 is adjusted according to the size of the tire 1 by horizontally moving the marking device 20 by the horizontal drive unit 10, in order that the distance of the heating head 27 from the center axis X—X of the tire 1 is adjusted properly to print the balance mark M at a predetermined position on the side wall of the tire 1. The rotating mechanism 8 turns the heating head 27 about the center axis X—X to set the heating head 27 at a desired angular position. The rotating mechanism 8 turns the heating head 27 to an angular position corresponding to a lightest point determined by the preceding uniformity measuring process on the tire 1 fixedly mounted on the marking table 3 so that the balance mark M can be marked at the lightest point on the tire 1. When marking the tire 1 with the balance mark M, the cylinder actuator 5 raises the marking table 3 to the marking position to position the tire 1 held on the marking table 3 close to the marking device 20.

Figure 4:
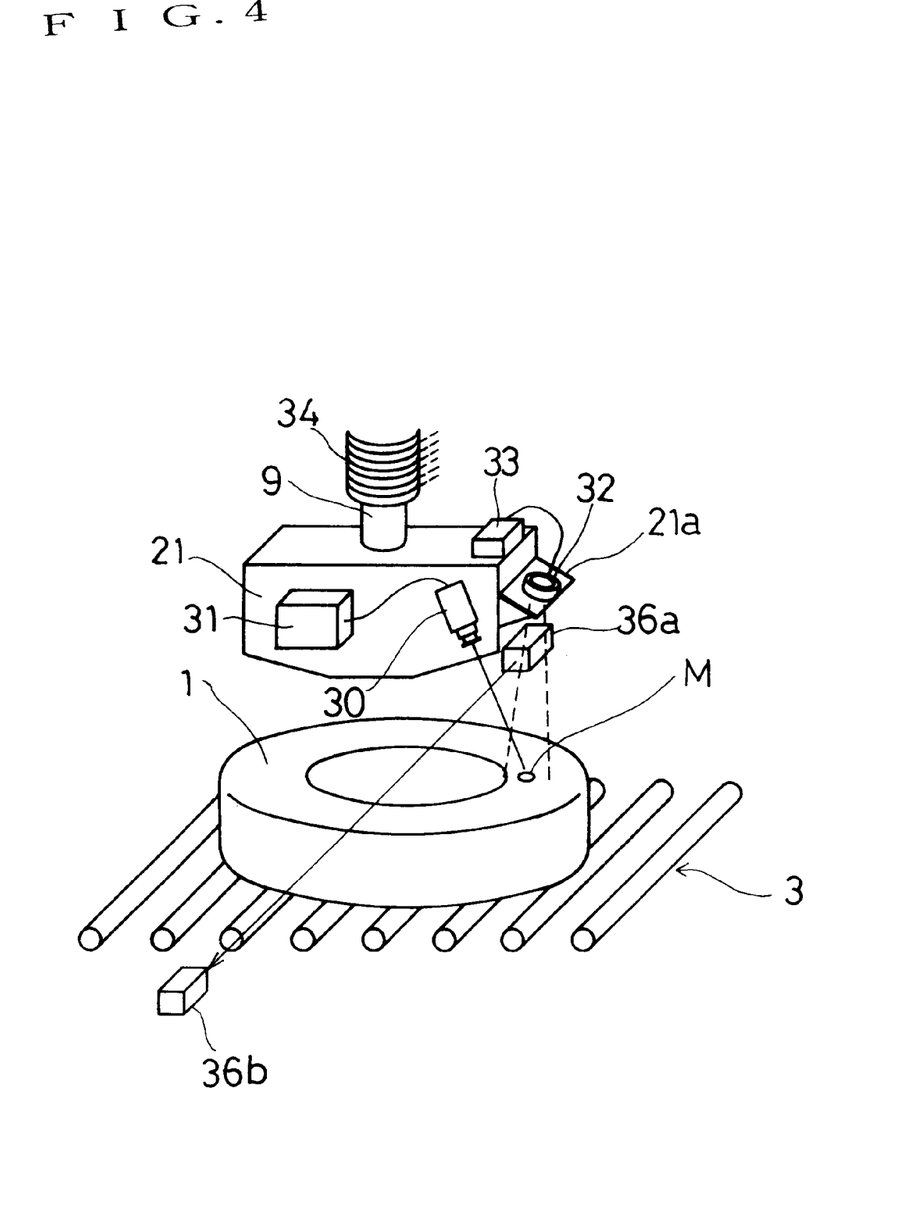
FIG. 4 is a schematic perspective view of a mark inspecting system in a preferred embodiment according to the present invention.

Referring to FIG. 4, a CCD camera 30 is attached in a predetermined position to the outer surface of one of the side plates 21 of the marking device 20. The CCD camera 30 is held on the side plate 21 with the its objective directed in substantially the same direction as the direction in which the heating head 27 is moved to push the transfer ribbon 25 so that the objective is focused on the balance mark M marked on the tire 1 when the tire 1 is lowered by a predetermined distance from the marking position to an image pickup position after the balance mark M has been marked on the tire 1. The CCD camera 30 operates its shutter upon the reception of a trigger signal. An illuminating device 32 is held on a bracket 21a attached to the marking device 20. The illuminating device 32 illuminates the tire 1 effectively after the tire 1 has been lowered to the image pickup position to enable the CCD camera 30 to form a satisfactory image of the balance mark M. An image processing device 31 for controlling the CCD camera 30 and processing the image formed by the CCD camera 30, and a power supply 33 for the illuminating device 32 are held on the marking device 20. Power is supplied to the image processing device 31 and the power supply 33 through slip rings 34 mounted on the rotating shaft 9. Signals are exchanged between the image processing device 31 and an external controller 35 also through slip rings 34 mounted on the rotating shaft 9.

A photocoupler 36 is disposed on a predetermined level between the CCD camera 30 and the marking table 3. The photocoupler 36 comprises a light projector 36a and a photodetector 36b. The light projector 36a and the photodetector 36b are disposed so that a light beam projected by the light projector 36a travels to the photodetector 36b in a horizontal plane extending below the CCD camera 30 and spaced a distance equal to the focal length of the CCD camera 30 from the CCD camera 30. When the marking table 3 mounted with the tire 1 is raised, the light beam projected by the light projector 36a of the photocoupler 36 is intercepted by the tire 1 and thereby the photodetector 36b is turned off. When the marking table 3 mounted with the tire 1 is lowered after the balance mark M has been marked on the tire 1 and the upper surface of the tire 1 is lowered below the plane in which the light beam projected by the light projector 36a travels to the photodetector 36b, the photodetector 36b receives the light beam projected by the light projector 36a and is turned on to provide a detection signal indicating the arrival of the balance mark M marked on the tire 1 at an inspecting position corresponding to the focal point of the CCD camera 30. The photocoupler 36 is controlled by the controller 35, and a detection signal provided by the photodetector 36b is given to the controller 35.

Figure 5:
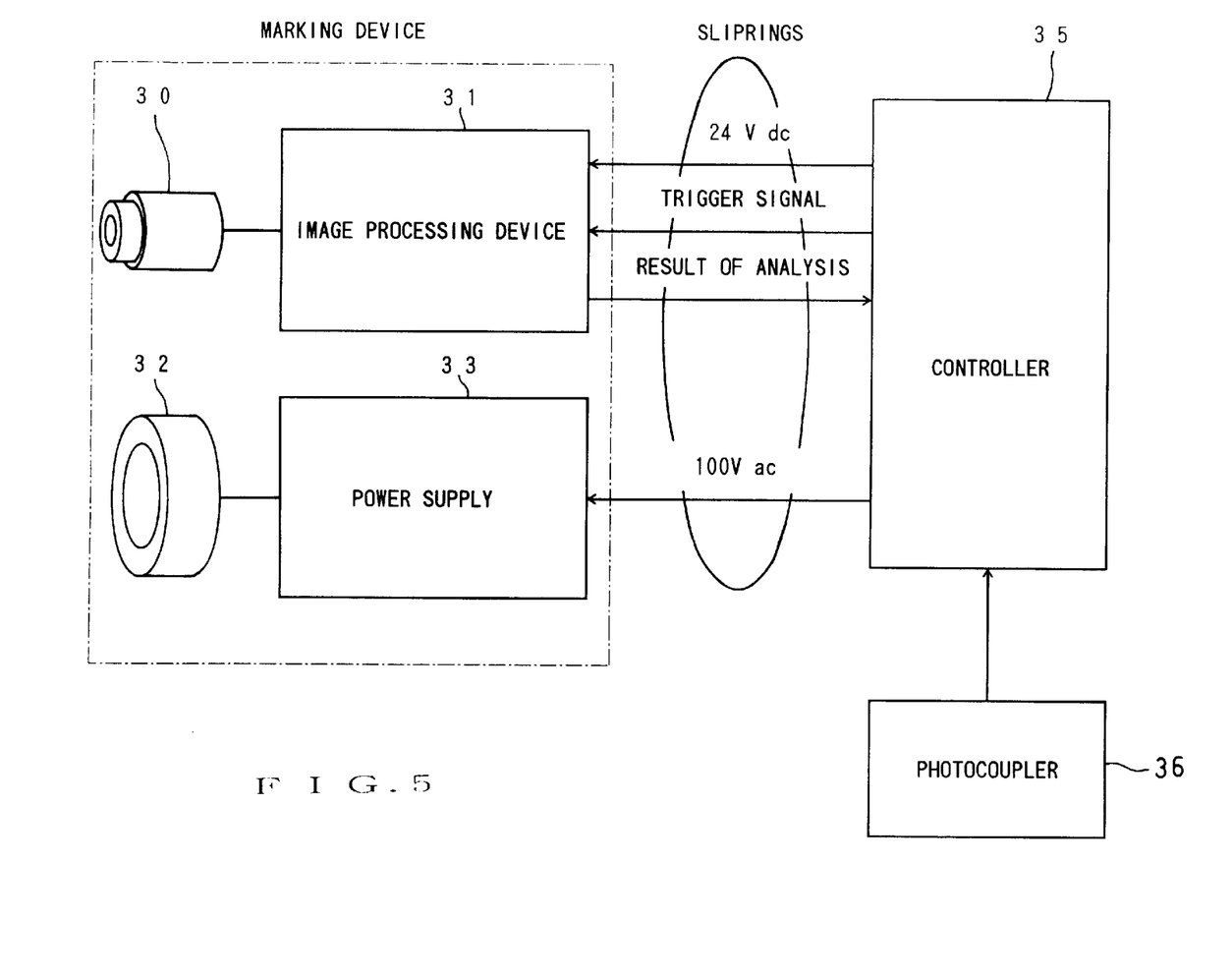
FIG. 5 is a block diagram of a control system included in the mark inspecting system.

Referring to FIG. 5 showing a control system for mark inspection, the controller 35 supplies dc power and a trigger signal to the image processing device 31 upon the reception of a detection signal from the photocoupler 36, and receives the result of analysis of the image formed by the CCD camera 30. The controller 35 supplies ac power to the illuminating device 32.

Figure 6:
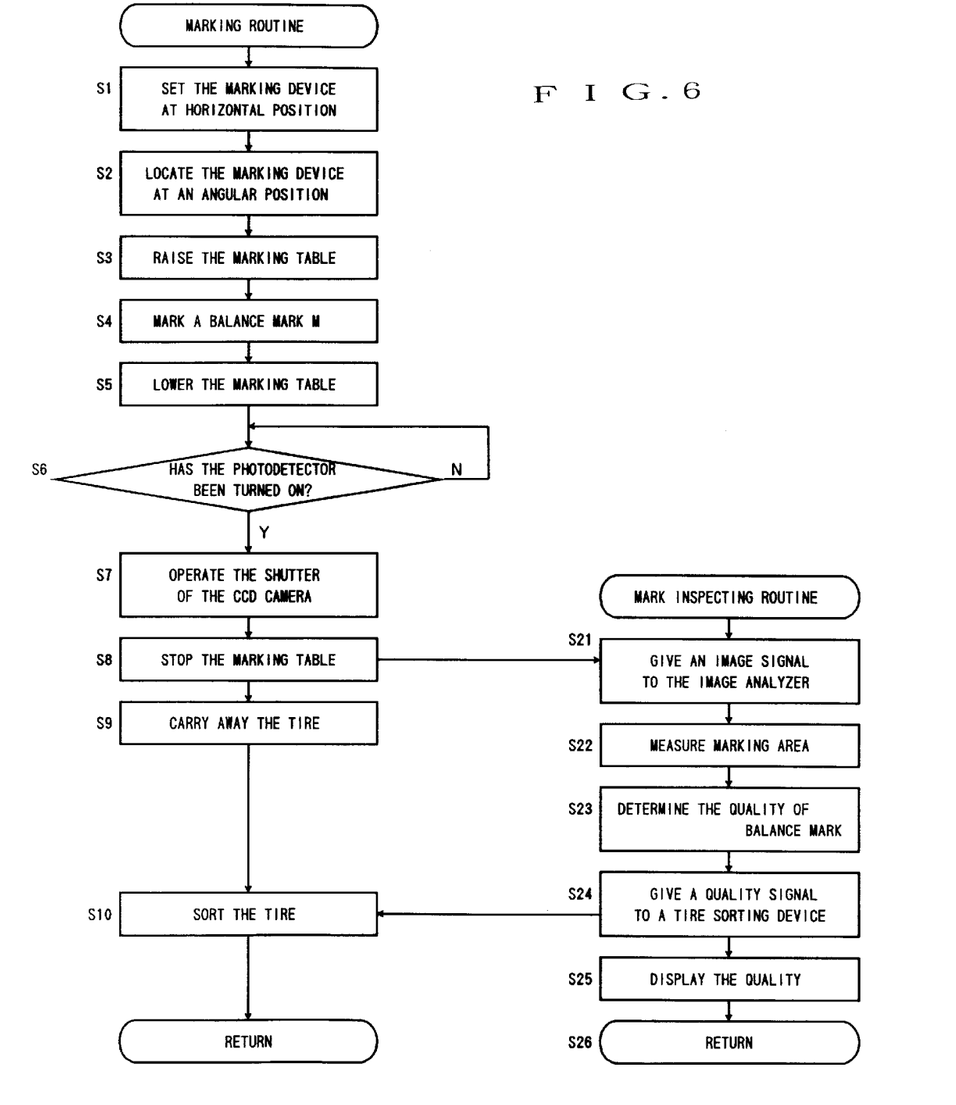
FIG. 6 is a flow chart of a control program to be carried out by the mark inspecting system shown in FIG. 4.

The operation of the mark inspecting system will be described with reference to a flow chart shown in FIG. 6. The marking device 20 is set at a horizontal position specified for marking tires of a specific type (step 1). The vertical rotating shaft 9 is turned to locate the marking device 20 at an angular position where the heating head 27 corresponds to a lightest point determined by the preceding uniformity measuring process on a tire 1 supported and centered on the marking (step 2). The marking table 3 supporting the tire 1 is raised to the predetermined marking position (step 3), and then the heating head 27 is pressed through the transfer ribbon 25 against the side wall of the tire 1 to mark a balance mark M by thermal transfer printing at the lightest point on the side wall of the tire 1 (step 4).

Subsequently, the marking table 3 is lowered (step 5). When the marking table 3 arrives at the inspecting position during its downward movement, the photodetector 36b of the photocoupler 36 is turned on (step 6), the controller 35 gives a trigger signal to the image processing device 31, and the image processing device 31 operates the shutter of the CCD camera 30 to form an image of the balance mark M marked on the tire 1 illuminated by the illuminating device 32 (step 7). The image of the balance mark M is formed while the making table 3 is being lowered. The marking table 3 is stopped at the transfer position, and then the tire 1 is carried away from the marking table 3 (step 9). The tires 1 thus inspected are sorted by the quality of the balance mark M (step 10).

An image signal representing an image of the balance mark M and provided by the CCD camera 30 in step 7 is given to an image analyzer included in the image processing device 31 (step 21). The image analyzer analyzes the image represented by the image signals to determine the area of the balance mark M (step 22). The balance mark M formed by thermal transfer printing by the marking device 20 is a solid circle of about 10 mm in diameter, and the CCD camera 30 is provided with 240,000 image points. If the number of dots (mark area) forming the balance mark M is in the range of 14,000 to 18,000, it is decided that the balance mark M is acceptable. Thus, chipped balance marks and deformed balance marks can accurately be distinguished from acceptable balance marks. After the quality of the balance mark M has been decided on the basis of the mark area thereof (step 23), the image processing device 31 gives a quality signal to a tire sorting device, not shown, (step 24) and the tire sorting device sorts the tire 1 by the quality of the balance mark M on the basis of the quality signal and displays the quality of the balance mark M (step 25).

Thus, the image signal representing the image of the balance mark M can automatically be obtained during the marking process, scarcely affecting the marking operation without conveying the tire 1 to a special position for mark inspection. Since mark inspection does not take additional time, the efficiency of the tire production line can significantly be improved.

The shutter of the CCD camera 30 is operated to produce an image signal representing the balance mark M in an instant during the downward movement of the marking table 3 after the balance mark M has been printed on the tire 1. The image of the balance mark M represented by the image signal is analyzed and the quality of the balance mark M is determined before the marking table 3 reaches the transfer position. Since the balance mark is inspected during the marking process, the inspection of the balance mark M does not increase the tire processing time; that is, the inspection of the balance mark M can be achieved without reducing the processing ability of the marking device 20. If an unacceptable balance mark M is formed due to the malfunction of the marking device 20, the unacceptable balance mark M is detected immediately and measures are taken to correct the malfunction of the marking device 20 without delay. Accordingly, marking unacceptable marks on successive tires can be avoided.

When forming an image of a mark marked on a tire by the prior art, a camera and the tire must be positioned relative to each other in a high accuracy and hence a large-scale device is necessary. Since the mark inspecting system in this embodiment of the present invention uses the CCD camera 30 and the illuminating device 32 held on the marking device in predetermined positions, respectively, to form an image of the balance mark M, the mark inspecting system does not need any large, special device for forming an image of the mark, and the mark inspecting system can be fabricated at a low cost and uses an available space efficiently.

The mark inspecting system in the foregoing embodiment inspects the balance mark M printed on the tire 1 by thermal transfer printing to se whether or not the balance mark M is printed properly. The present invention is applicable to inspecting a label printed with a code, such as a bar code, representing the result of measurement of a tire, identification information and the like and attached to the tire. When such labels are used for marking tires, a tape on which labels are arranged is supplied, a marking device prints a bar code on a label with a print head, and the label is attached to a tire. A camera or a bar-code scanner is held on the marking device. The texts represented by the bar code printed on the label attached to the tire are read and a decision is made on whether or not the label attached to the tire is provided with an appropriate bar code. In this case also, the mark inspecting system does not need any large, special device for inspecting the label to decide whether or not an appropriate mark is formed on the tire, and the mark inspecting system can be fabricated at a low cost and uses an available space efficiently. The mark inspecting system takes a very short time for inspection. Since the mark inspecting system forms and inspects an image of a mark immediately after the mark has been formed, an unacceptable mark can be detected immediately and measures are taken without delay to avoid forming unacceptable marks on successive tires, so that the efficiency of the tire production line can significantly be improved.

A limit switch may be used instead of the photocoupler 36 for detecting the arrival of the balance mark M at a position in a predetermined positional relation with the CCD camera 30 during the downward movement of the tire 1. A device capable of measuring the distance of downward travel of the marking table 3 or a device capable of measuring the duration of downward travel of the marking table 3 may be used instead of the photocoupler 36.

The present invention is applicable to a marking system in which a tire is supported on a stationary marking table, and a marking device is moved toward the tire supported on the marking table. The mark may be printed by a contactless printing method, such as an ink-jet printing method, instead of a contact printing method, such as the thermal transfer printing method as mentioned in the foregoing description.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A mark inspecting system comprising:
    a camera held in a predetermined position on a marking device capable of being located close to or in contact with a tire supported on a marking table to form a mark on the tire;
    a detecting means for detecting the separation of the marking device by a predetermined distance from the tire after the mark has been marked on the tire;
    a control means for operating the camera to form an image of the mark marked on the tire upon the reception of a detection signal provided by the detecting means upon the detection of the separation of the marking device by the predetermined distance from the tire; and a mark inspecting means for analyzing the image of the mark formed by the camera for the inspection of the mark.

2. The mark inspecting system according to claim 1, wherein the mark inspecting means discriminates between an acceptable mark and an unacceptable mark.

3. The mark inspecting system according to claim 1, wherein the mark inspecting means inspects a mark marked on a tire to see if the mark is proper for the tire.

4. The mark inspecting system according to claim 1 further comprising an illuminating device held on the marking device.

* * * * *